US010454930B2

(12) United States Patent
Chakraborty et al.

(10) Patent No.: US 10,454,930 B2
(45) Date of Patent: Oct. 22, 2019

(54) SYSTEM AND METHOD FOR LOCAL DATA IP BASED NETWORK SECURITY FOR PREVENTING DATA BREACH ATTEMPTS IN A MULTI-TENANT PROTECTION STORAGE DEPLOYMENT

(71) Applicant: EMC IP Holding Company LLC, Hopkinton, MA (US)

(72) Inventors: Subhasish Chakraborty, Santa Clara, CA (US); Terry Gene Hahn, Los Altos, CA (US); Hongyu Zhang, San Jose, CA (US); Rodney Edward Radford, Clayton, NC (US); Catherine E. Agbaw, Raleigh, NC (US); Manish Chhabra, Santa Clara, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 90 days.

(21) Appl. No.: 15/650,600

(22) Filed: Jul. 14, 2017

(65) Prior Publication Data

US 2019/0020652 A1 Jan. 17, 2019

(51) Int. Cl.

| | |
|---|---|
| ***H04L 29/06*** | (2006.01) |
| ***G06F 21/60*** | (2013.01) |
| ***G06F 21/31*** | (2013.01) |
| ***G06F 16/172*** | (2019.01) |
| ***G06F 21/44*** | (2013.01) |

(Continued)

(52) U.S. Cl.

CPC ........ *H04L 63/0876* (2013.01); *G06F 16/172* (2019.01); *G06F 21/31* (2013.01); *G06F 21/44* (2013.01); *G06F 21/606* (2013.01); *G06F 21/78* (2013.01); *H04L 63/0236* (2013.01); *H04L 63/08* (2013.01); *H04L 63/104* (2013.01); *G06F 12/0875* (2013.01); *G06F 12/1458* (2013.01);

(Continued)

(58) Field of Classification Search

None

See application file for complete search history.

(56) References Cited

U.S. PATENT DOCUMENTS 7,007,080 B2 * 2/2006 Wilson .................... H04L 12/14 709/220
7,349,382 B2 * 3/2008 Marimuthu ........... H04L 63/102 370/351

(Continued)

FOREIGN PATENT DOCUMENTS

WO 2008/008183 A2 1/2008

*Primary Examiner* — Saleh Najjar
*Assistant Examiner* — Michael W Chao
(74) *Attorney, Agent, or Firm* — Chamberlain, Hrdlicka, White, Williams & Aughtry

(57) ABSTRACT

A data storage device includes advertised internet protocol (IP) addresses, a logical data storage, and a resource request processor. The logical data storage includes an object storage. The resource request processor obtains a data access request that includes a destination IP address and that requests a portion of data stored in the object storage. The resource request processor makes a determination to allow access to the portion of the data based on a multifactor authorization. The multifactor authorization is based, at least in part, on an association between the destination IP address and the portion of the data. In response to the determination, resource request processor provides the portion of the data to a requestor specified in the data access request.

14 Claims, 18 Drawing Sheets

Data Storage Device 110
Data Storage 120
Tenant Resources 121
Tenant A Resources 122A
Tenant N Resources 122N
Object Storage 132
Resource Request Processor 149
Mappings Data 150
Tenant Resource to Advertised IP Address Mapping(s) 151
Tenant Resource to Credential Mapping(s) 155
Tenant Resource to Requestor IP Address Mapping(s) 160
Universally Unique ID Mappings 165
Version Controlled Advertised IP Address Mappings 170
Version Controlled Cache 175
Advertised IP Addresses 180
Advertised IP address A 181
Advertised IP address O 182
Clients 100
Client A 101
Client P 102

(51) Int. Cl.
*G06F 21/78* (2013.01)
*G06F 12/14* (2006.01)
*H04L 29/12* (2006.01)
*G06F 12/0875* (2016.01)

(52) U.S. Cl.
CPC .... *H04L 61/2061* (2013.01); *H04L 2463/082* (2013.01)

(56) References Cited

U.S. PATENT DOCUMENTS 8,612,969 B2 12/2013 Nakano et al.
8,635,184 B2 1/2014 Hsu et al.
9,251,114 B1* 2/2016 Ancin ............... G06F 15/17331
10,282,764 B2* 5/2019 Van Biljon ............ G06Q 30/04
10,333,889 B2* 6/2019 Thakkar .............. H04L 61/2038
10,367,802 B2* 7/2019 Koushik ............. H04L 63/0807
10,374,949 B2* 8/2019 Miller ................... H04L 45/586
2005/0144292 A1* 6/2005 Banga ..................... H04L 29/06 709/227
2005/0259672 A1* 11/2005 Eduri .................... G06F 13/385 370/412
2010/0241722 A1 9/2010 Seminaro et al.
2010/0318609 A1* 12/2010 Lahiri ..................... G06F 9/455 709/205
2011/0299537 A1* 12/2011 Saraiya ............... H04L 61/2596 370/392
2012/0131156 A1* 5/2012 Brandt ................ H04L 61/2535 709/221
2013/0139244 A1* 5/2013 Blaich ................. H04L 63/0236 726/11
2013/0346645 A1 12/2013 Mayhew
2014/0108474 A1* 4/2014 David ..................... G06F 17/30 707/827
2014/0137215 A1 5/2014 Hummel et al.
2014/0201814 A1* 7/2014 Barkie .................. H04L 63/107 726/4
2015/0207683 A1* 7/2015 Adogla ............... H04L 41/0893 709/223
2015/0263899 A1* 9/2015 Tubaltsev ............... H04L 45/02 370/254
2016/0105393 A1* 4/2016 Thakkar .............. H04L 41/0823 709/220
2016/0212170 A1* 7/2016 Martherus ............... H04L 63/20
2016/0234343 A1* 8/2016 Fausak ................ H04L 12/4679
2016/0292443 A1* 10/2016 von Muhlen ..... G06F 17/30115
2017/0064749 A1 3/2017 Jain et al.
2018/0063087 A1* 3/2018 Hira ...................... G06F 15/177
2018/0139174 A1* 5/2018 Thakkar .............. H04L 61/2038
2018/0287996 A1* 10/2018 Tripathy ............. H04L 61/2503
2018/0316676 A1* 11/2018 Gilpin ..................... H04L 63/10

* cited by examiner

SYSTEM AND METHOD FOR LOCAL DATA IP BASED NETWORK SECURITY FOR PREVENTING DATA BREACH ATTEMPTS IN A MULTI-TENANT PROTECTION STORAGE DEPLOYMENT

BACKGROUND

Computing devices generate, use, and store data. The data may be, for example, images, document, webpages, or meta-data associated with any of the files. The data may be stored locally on a persistent storage of a computing device and/or may be stored remotely on a persistent storage of another computing device.

SUMMARY

In one aspect, a data storage device in accordance with one or more embodiments of the invention includes advertised internet protocol (IP) addresses; a logical data storage including an object storage; and a resource request processor. The resource request processor obtains a data access request that includes a destination IP address and that requests a portion of data stored in the object storage; makes a determination to allow access to the portion of the data based on a multifactor authorization; in response to the determination, provides the portion of the data to a requestor specified in the data access request. The multifactor authorization is based, at least in part, on an association between the destination IP address and the portion of the data.

In one aspect, a method of operating a data storage device in accordance with one or more embodiments of the invention includes obtaining, by the data storage device, a data access request that includes a destination IP address and that requests a portion of data stored in an object storage; making a determination to allow access to the portion of the data based on a multifactor authorization; and in response to the determination, providing the portion of the data to a requestor specified in the data access request. The multifactor authorization is based on, at least in part, an association between the destination IP address and the portion of the data.

In one aspect, a non-transitory computer readable medium in accordance with one or more embodiments of the invention includes computer readable program code, which when executed by a computer processor enables the computer processor to perform a method for operating a data storage device, the method includes obtaining, by the data storage device, a data access request that includes a destination IP address and that requests a portion of data stored in an object storage; making a determination to allow access to the portion of the data based on a multifactor authorization; and in response to the determination, providing the portion of the data to a requestor specified in the data access request. The multifactor authorization is based on, at least in part, an association between the destination IP address and the portion of the data.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1A-6, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to methods, devices, and systems for managing an object storage. More specifically, the methods, devices, and systems may provide functionality for restricting access to data in the object storage. Access to the data may be provided when a data access request meets all of the requirements of a multifactor authorization. In one or more embodiments of the invention, the multifactor authorization may be based on, at least in part, an internet protocol (IP) address of a device requesting to access data stored in the data storage device, a credential included in the a data access request, and a destination IP address of the packets used to transmit the data access request. The multifactor authorization may be based on other factors, additional factors, or fewer factors without departing from the invention.

Figure 1A:
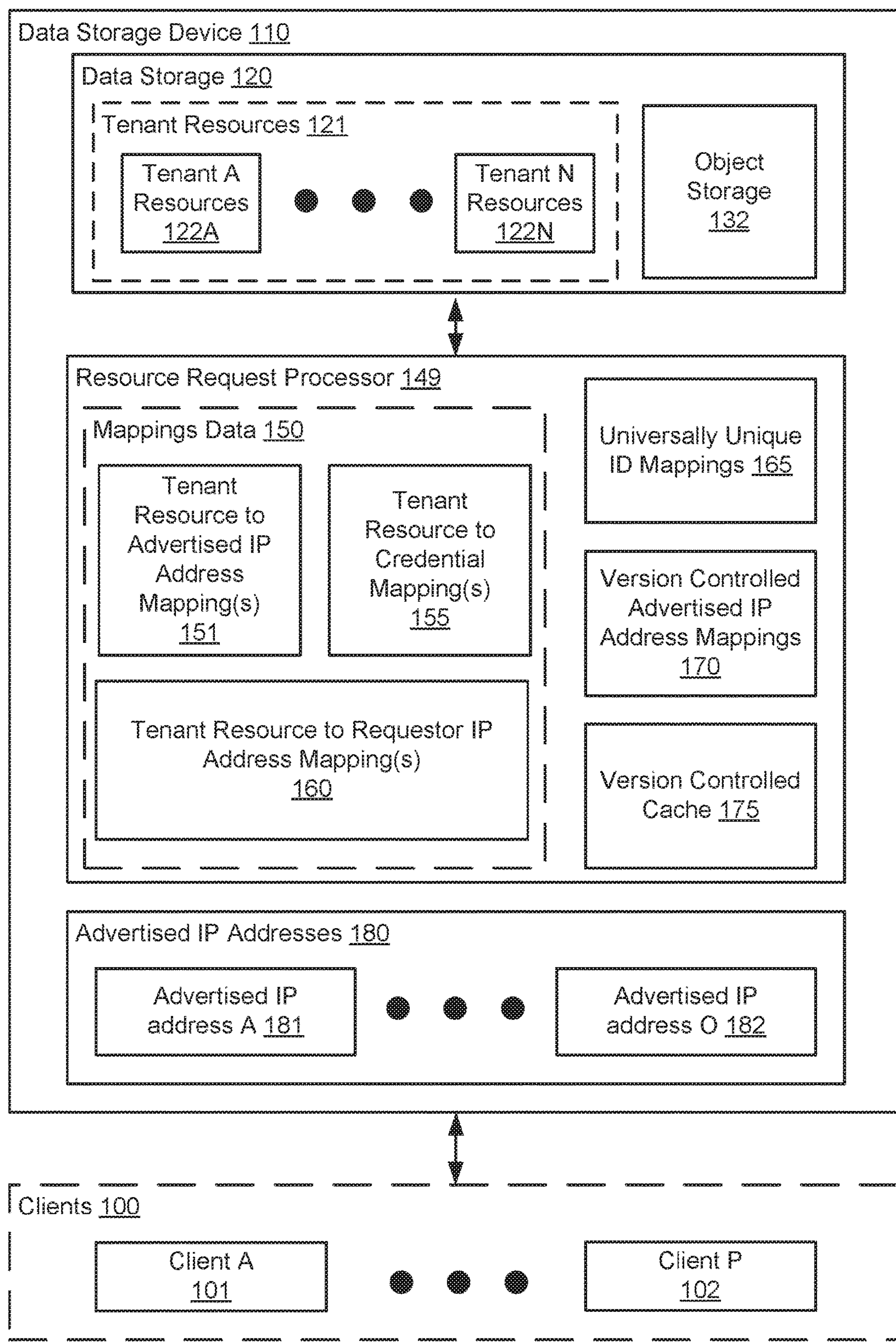
FIG. 1A shows a diagram of a system in accordance with one or more embodiments of the invention.

FIG. 1A shows a system in accordance with one or more embodiments of the invention. The system may include clients (100) that store and/or read data in a data storage device (110).

The clients (100) may be computing devices. The computing devices may be, for example, mobile phones, tablet computers, laptop computers, desktop computers, or servers. The clients (100) may be other types of computing devices without departing from the invention.

The clients (100) may be operably connected to the data storage device (110) via a communication link. The communication link may be any type of link that provides an operable connection such as, for example, a direct link, an indirect link, a wireless network, or a wired network. A direct link may be, for example, a port to port connection via a single wired cable. An indirect link may be, for example, a port to port link via multiple cables and an intermediary communication device. The intermediary communication device may be a hub, repeater, router, or any other type of communication device. A wireless network may be, for example, a network that includes one or more wireless links such as an IEEE 802.11 compliant link. A wired network may be, for example, a network such as the Internet. The clients (100) and the data storage device (110) may be linked by any other type or combination of communication links without departing from the invention.

The clients (100) may be programmed to store and/or read data to/from the data storage device (110) via the operable connection between the clients (100) and the data storage device (110). For example, the clients (100) may store data in the data storage device (110) to backup their data, free up storage space by transferring data to the data storage device (110), or make data accessible to other clients by storing it in the data storage device (110).

In one or more embodiments of the invention, each client may be associated with a tenant that has privileges to store or retrieve data from the data storage device. To retrieve data from the data storage device (110), each client associated with a particular tenant may be configured to send requests to a particular advertised IP address of the data storage device that is associated with the particular tenant and includes a particular credential associated with the particular tenant.

The data storage device (110) may be a computing device. The computing devices may be, for example, a server and/or a cloud resource. The data storage device (110) may be other types of computing devices without departing from the invention.

The data storage device (110) may allow clients to store and/or retrieve data stored on the data storage device (110). Before allowing data to be retrieved, the data storage device (110) may perform a multifactor authorization of a data access request from a client. If the data access request fails the multifactor authorization, the data storage device (110) may not provide the requested data to the client.

In one or more embodiments of the invention, the data storage device may be a physical device that includes non-transitory computer readable storage, memory (e.g. Random Access Memory), and one or more processors. The processor may be hardware processors comprising circuitry. In one or more embodiments of the invention, the processors may be central processing units, risk processors, digital signal processors, packet processors, network processors, field programmable gate array, or any other type of digital processor. The memory may be hardware comprising circuitry. In one or more embodiments of the invention, the memory maybe random access memory. The non-transitory storage may include instructions, also referred to as computer readable program code, which when executed by the one or more processors enable the data storage device to perform the functions described in this application and shown in FIGS. 3-6. While illustrated in FIG. 1A as a single device, the data storage device (110) maybe implemented as a logical device that utilizes the resources of a number of different computing devices without departing from the invention.

In one or more embodiments of the invention, the data storage device may be implemented as a cloud service. For example, the data storage device may be implemented as computing code stored on a non-transitory medium that when executed by a cloud computing system causes the cloud computing system to perform the functions described in this application and shown in FIGS. 3-6.

The data storage device (110) may include a data storage (120) for storing data, a resource request processor (149) that processes data access requests, and advertised IP addresses (180) that the data storage device (110) publicly advertises to a network to which both the data storage device (110) and the clients (100) are connected. Each component of the data storage device (110) is discussed below.

The data storage (120) may store data from the clients (100) and associate the stored data with tenants. The data storage (120) may include an object storage (132) for storing data and tenant resources (121) that specify data stored in the object storage (132) of each tenant. For additional details regarding the tenant resources, See FIG. 1B. For additional details regarding the object storage (132), See FIG. 1C.

The resource request processor (149) may process data access requests from tenants. More specifically, the resource request processor (149) may perform a multifactor authorization of each data access request before providing the requested data in response to the request. In response to receiving a data access request, the resource request processor (149) may perform the methods illustrated in FIGS. 3-6.

The resource request processor (149) may include mappings data (150) that maps tenant resources to elements of the multifactor authorization, universally unique identifier (UUID) mappings that map UUIDs to namespaces associated with each tenant, a version controlled advertised IP address mappings that map data access requests received by each advertised IP address to UUIDs, and a version controlled cache (175) that include version controlled entries that map data access requests received by each advertised IP address to UUIDs. For additional details regarding each of the aforementioned mappings or caches, See FIGS. 1E-1J. In one or more embodiments of the invention, each of the aforementioned mappings may specify an association.

The advertised IP addresses (180) may be IP addresses that the data storage device (110) advertises to a network to which the data storage device (110) is attached. By advertising the IP addresses, packets addressed to any of the advertised IP addresses (180) may be forwarded to the data storage device (110) via the network. Thus, while the data storage device may be a single logical device, it may receive IP traffic addressed to multiple, different IP addresses.

Figure 1B:
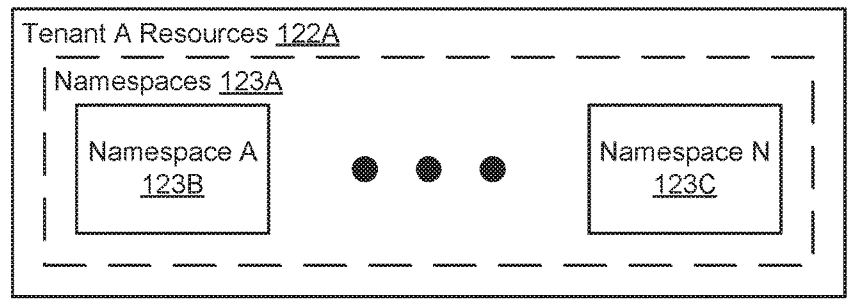
FIG. 1B shows a diagram of tenant resources of an example tenant in accordance with one or more embodiments of the invention.

FIG. 1B shows an example of tenant A resources (122A) in accordance with one or more embodiments of the invention. Tenant A resources (122A) may be a data structure that specifies data stored in the object storage that is associated with tenant A. The tenant resources (121, FIG. 1A) include similar tenant resource data for each tenant. Each tenant resources associated with each tenant may be a data structure that identifies files and/or objects associated with the tenant.

For example, tenant A resources (122A) specifies a number of namespaces (123A-123N). Each namespace may be associated with a different system for organizing and uniquely naming files or data objects stored in the object storage (132, FIG. 1A). Each namespace may include information that enables requested data to be retrieved from the object storage (132, FIG. 1A). Each namespace may be associated with a namespace identifier (not shown) that enables the namespace to be differentiated from other namespaces of the tenant A resources.

Figure 1C:
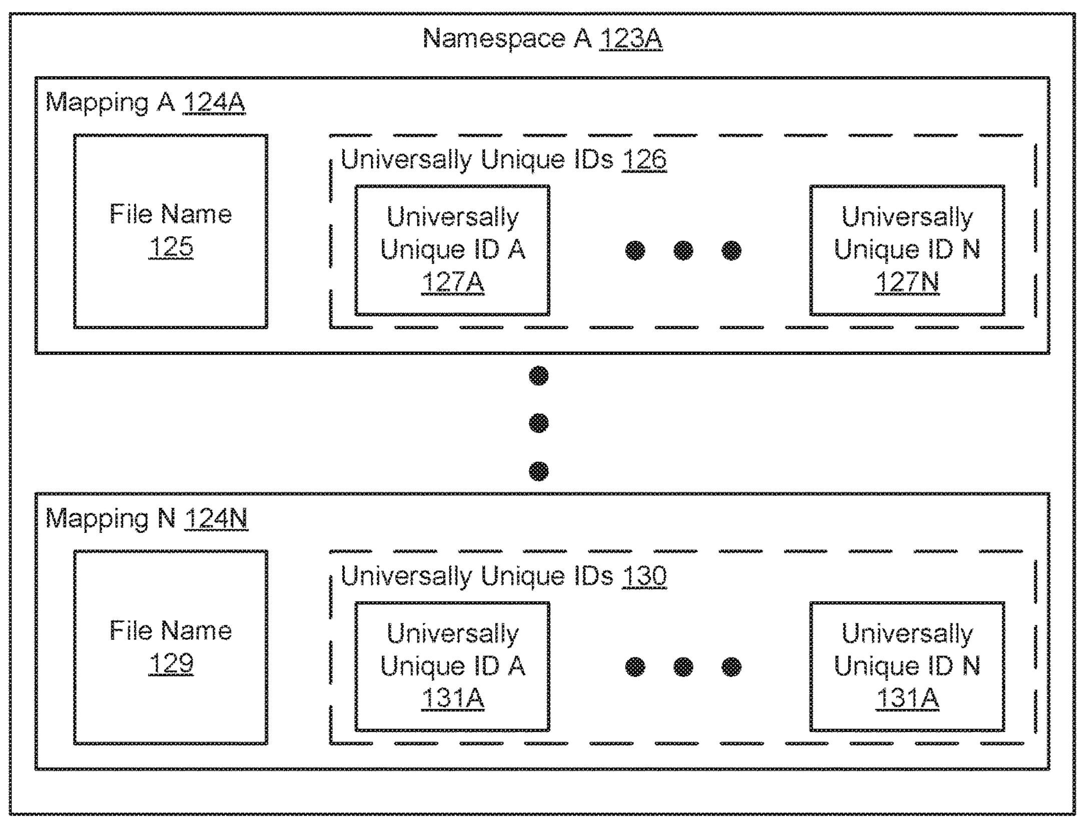
FIG. 1C shows a diagram of a namespace of a tenant resources in accordance with one or more embodiments of the invention.

FIG. 1C shows an example of namespace A (123A) in accordance with one or more embodiments of the invention. Namespace A (123A) includes a number of mappings (124A, 124N) that relate a name of a file to one or more UUIDs of the object storage.

Figure 1D:
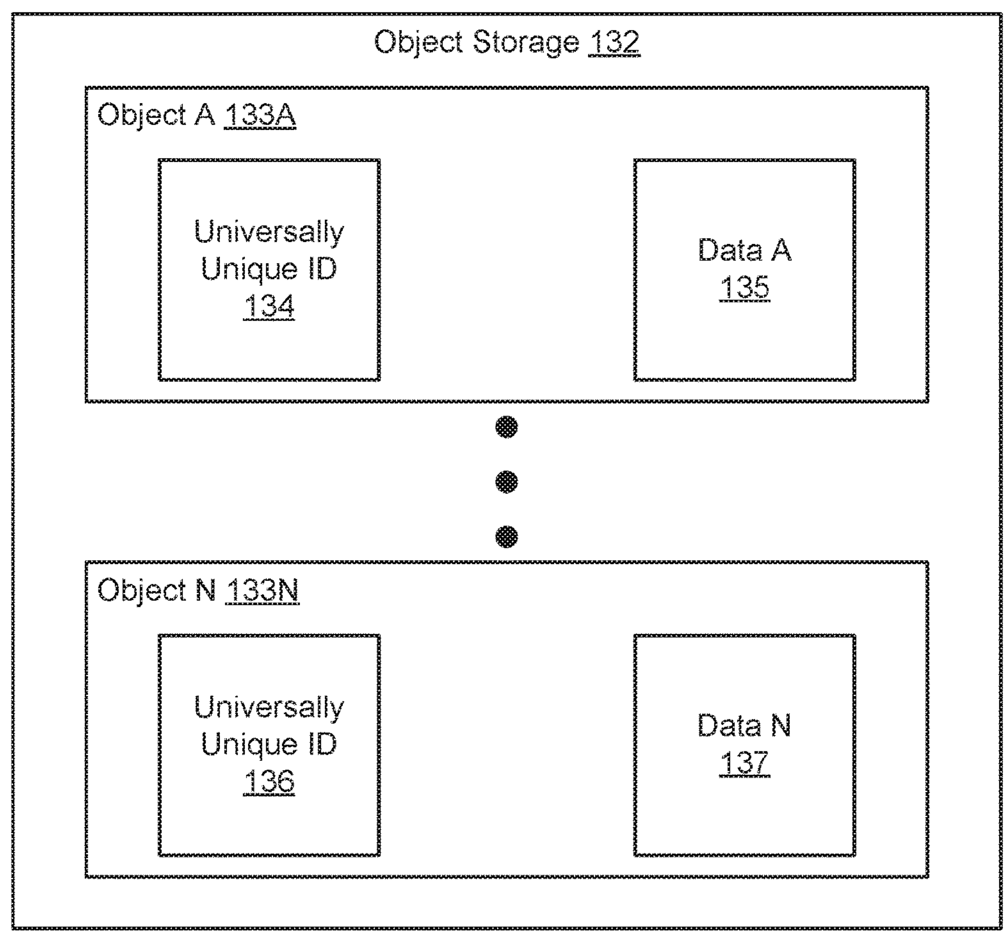
FIG. 1D shows a diagram of an object storage in accordance with one or more embodiments of the invention.

FIG. 1D shows object storage (132) in accordance with one or more embodiments of the invention. As used herein, an object storage is a data storage architecture that manages data as objects. Each object of the object storage may include data and a UUID. Each object may include a number of bytes for storing data in the object. In one or more embodiments of the invention, the object storage does not include a file system.

In one or more embodiments of the invention, the object storage (132) is a logical storage comprising any number of physical and/or cloud resources linked to form a single logical storage. The physical resources may be, for example, hard disk drives, solid state drives, or any other type of persistent storage. The cloud resources may be a second logical storage that includes any number of physical storage devices operable linked and/or unified to form a logical storage. The second logical storage may include redundancy or other data integrity features that ensure that failure of any of the physical storage elements does not cause data stored in the logical storage to be lost. The physical resources of the second logical storage of the cloud resources may be physically separated across a number of computing devices other than the data storage device that are each operably connected to the data storage device.

In one or more embodiments of the invention, the object storage (132) is a deduplicated storage. As used herein, a deduplicated storage refers to a storage that attempts to reduce the required amount of storage space to store data by not storing multiple copies of the same files or bit patterns. Rather, when a new file or bit pattern is sent to the object storage for storage, the storage may compare all or a portion of the new file or bit pattern to files or bit patterns already stored in the object storage. If the new file or bit pattern, or a portion therefor, matches a file or bit pattern, or a portion thereof, already stored in the object storage, the new file or bit pattern, or portion thereof, is not stored in the object storage and the already stored file or bit pattern, or portion thereof, is associated with the filename included in the storage request for later retrieval. In other words, a new namespace entry of a tenant resources may be added without actually storing the data included in the data storage request in the object storage. The new namespace entry may specify the name of pre-existing object that includes the data included in the data storage request.

In one or more embodiments of the invention, a file or bit pattern stored in the object storage (132) may be associated with one tenant or multiple tenants. For example, if a single tenant requests that a unique file be stored in the object storage, the object storage will store the unique file and only associate the stored unique file with resources of the single tenant. However, if a second tenant requests that the unique file be stored in the object storage after the unique file is already stored in the object storage, the object storage will not store a second copy of the unique file in the object storage and associate the second copy with the second tenant. Rather, the object storage (132) will only associate the stored unique file with the second tenant in addition to the single tenant.

Thus, if a first tenant and a second tenant have requested that a unique file be stored in the object storage, each of the tenant resources (121, FIG. 1A) associated with each tenant will include mappings between a file name specified by each tenant and the UUID of the object storage (132) associated with the data (e.g., 135, 137, FIG. 1D) containing the stored file. Thus, the data of the file may be retrieved from the object storage (132) using either filename (or other identifier) given to the file by either tenant and the corresponding tenant resources that map the file name to the UUID of the object storage.

Figure 1E:
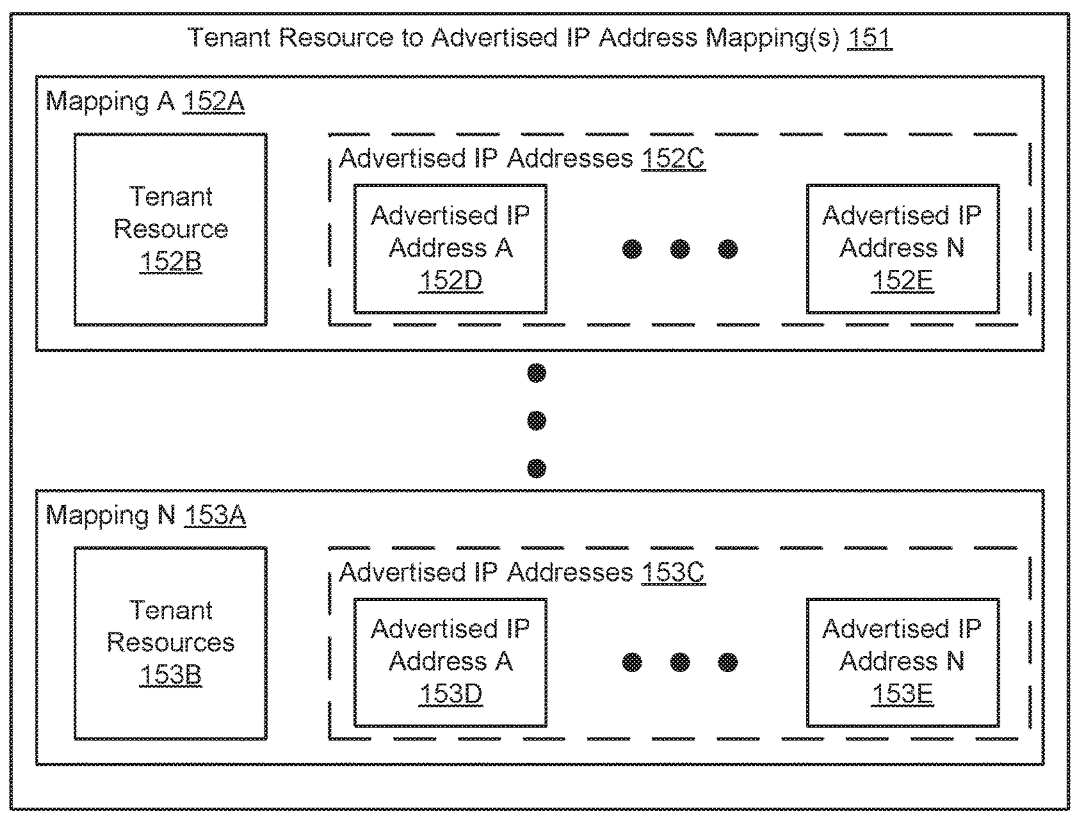
FIG. 1E shows a diagram of tenant resource to advertised IP address mappings in accordance with one or more embodiments of the invention.
Figure 1F:
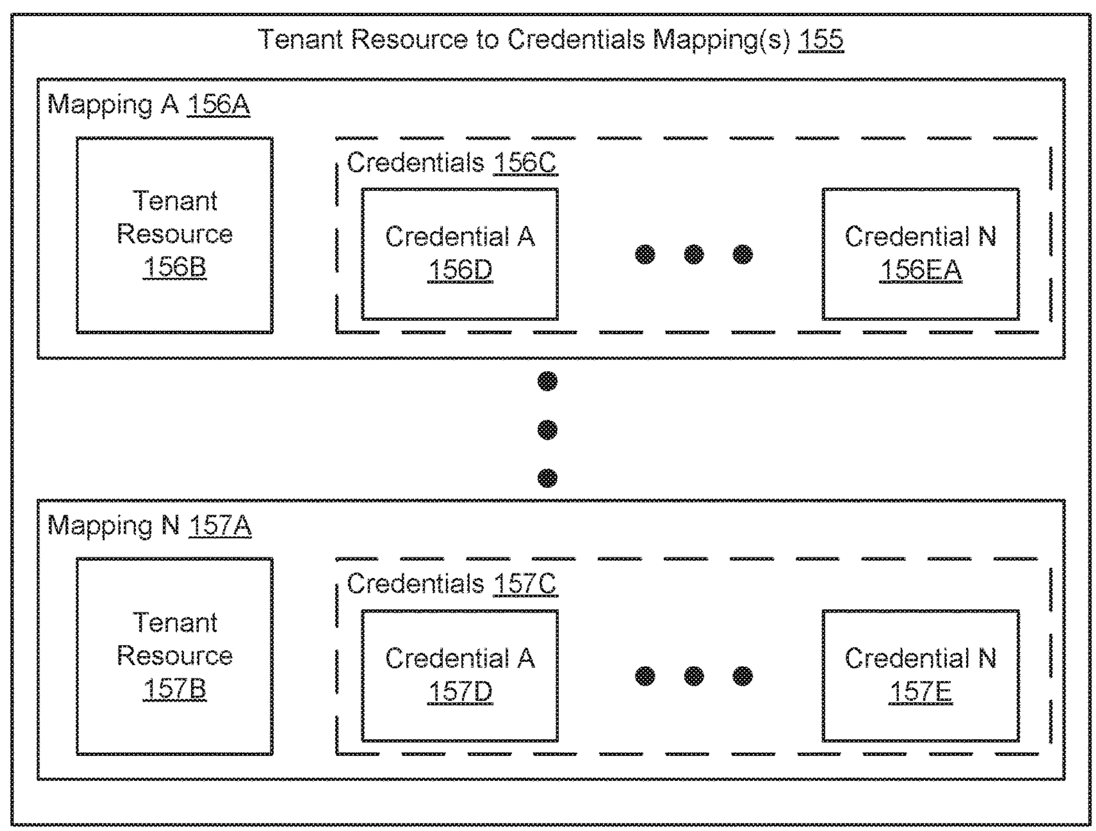
FIG. 1F shows a diagram of tenant resource to credential mappings in accordance with one or more embodiments of the invention.
Figure 1G:
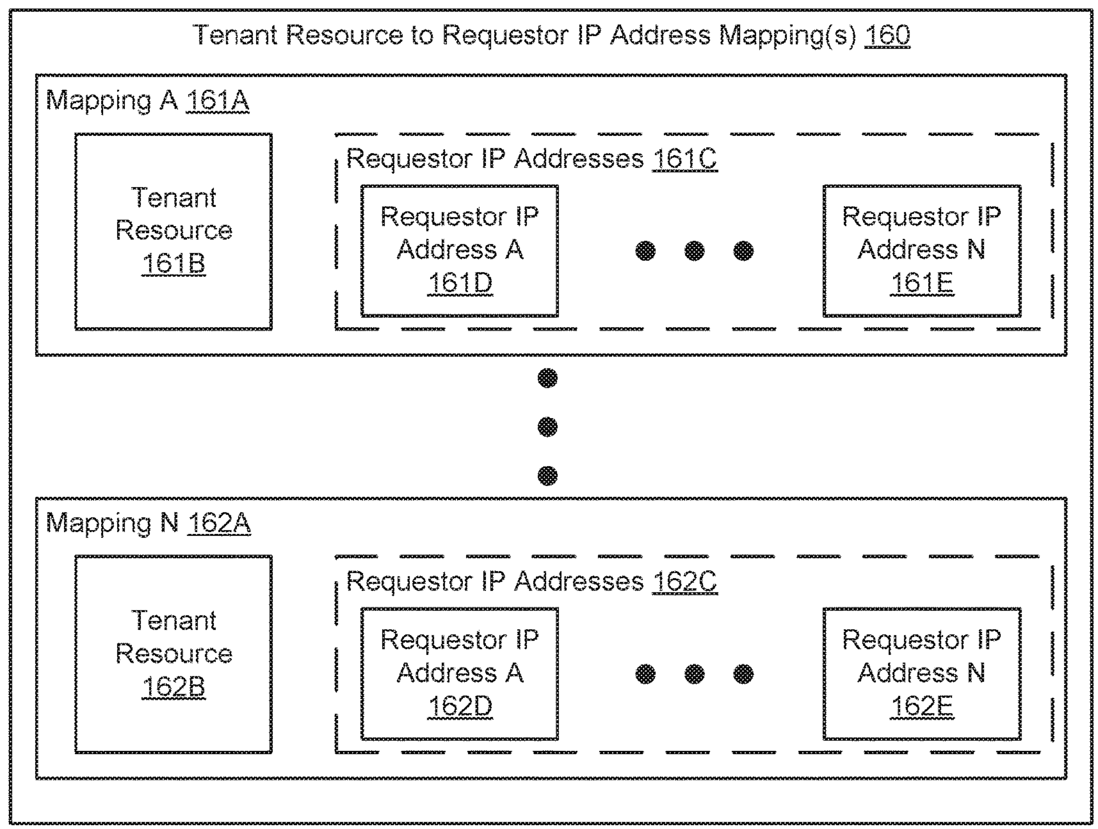
FIG. 1G shows a diagram of tenant resource to requestor IP address mappings in accordance with one or more embodiments of the invention.

FIGS. 1E-1G show examples of mappings between tenant resources and different types of data used in the multifactor authorization process. Each of the aforementioned mappings may be provided by a tenant or may be generated as data is stored in the data storage device. For example, when a client associated with a tenant requests storage of data in the data storage device, the data storage device may, in addition to storing the data, generate mappings between the newly stored tenant resource and an advertised IP address, a credential associated with the tenant, and/or a requestor IP address associated with the tenant. The aforementioned mappings may then be used when a client attempts to access the newly stored data as part of the multifactor authorization. In one or more embodiments of the invention, each of the aforementioned mappings may specify an association.

FIG. 1E shows an example of tenant resource to advertised IP address mapping(s) (151). The aforementioned mappings may include a number of mappings (152A, 153A) that each map tenant resources (152B, 153B) to advertised IP addresses (152C, 153C) of the data storage device. The tenant resources (152B, 153B) may specify, for example, a namespace of a tenant resources (121, FIG. 1A).

FIG. 1F shows an example of tenant resource to credentials mapping(s) (155). The aforementioned mappings may include a number of mappings (156A, 157A) that each map tenant resources (156B, 157B) to credentials (156C, 157C) associated with the tenant. The tenant resources (156B, 157B) may specify, for example, a namespace of a tenant resources (121, FIG. 1A).

FIG. 1G shows an example of tenant resource to requestor IP address mapping(s) (160). The aforementioned mappings may include a number of mappings (161A, 162A) that each map tenant resources (161B, 162B) to requestor IP address (es) (161C, 162C) associated with the tenant. The tenant resources (161B, 162B) may specify, for example, a namespace of a tenant resources (121, FIG. 1A).

While the mappings shown in FIGS. 1E-1G could be used as part of the multifactor authorization processes, doing so may computationally or storage access burden the data storage device. Specifically, each of the mappings shown in FIGS. 1E-1G map tenant resources to one or more pieces of authorization information used as part of the multifactor authorization process. However, doing so would require inverting the mappings which requires walking through the aforementioned mappings which is computationally expensive. In other words, the data access requests will include the authorization information used as part of the multifactor authorization but the aforementioned mappings do not directly map the authorization information to a file name or other identifier.

In one or more embodiments of the invention, the data storage device (110) may include UUID mapping that map a UUID to one or more namespaces of tenant resources, version controlled advertised IP address mappings that map advertised IP addresses of the data storage device to one or more UUIDs, and a version controlled cache that version controls mappings between advertised IP addresses of the data storage device and one or more UUIDs. Each of the aforementioned mappings/cache may be used to reduce the computational/bandwidth/storage access requirements for performing a multifactor authorization of a data access request and thereby improve the performance of the data storage device.

More specifically, the aforementioned mappings/cache may eliminate the need to invert any of the mappings shown in FIGS. 1E-1G to perform a multifactor authorization each time a multifactor authorization needs to be performed. In one or more embodiments of the invention, the aforementioned mappings are only generated when data is stored in the object storage. In one or more embodiments of the invention, the aforementioned cache is only generated upon startup of the data storage device.

Figure 1H:
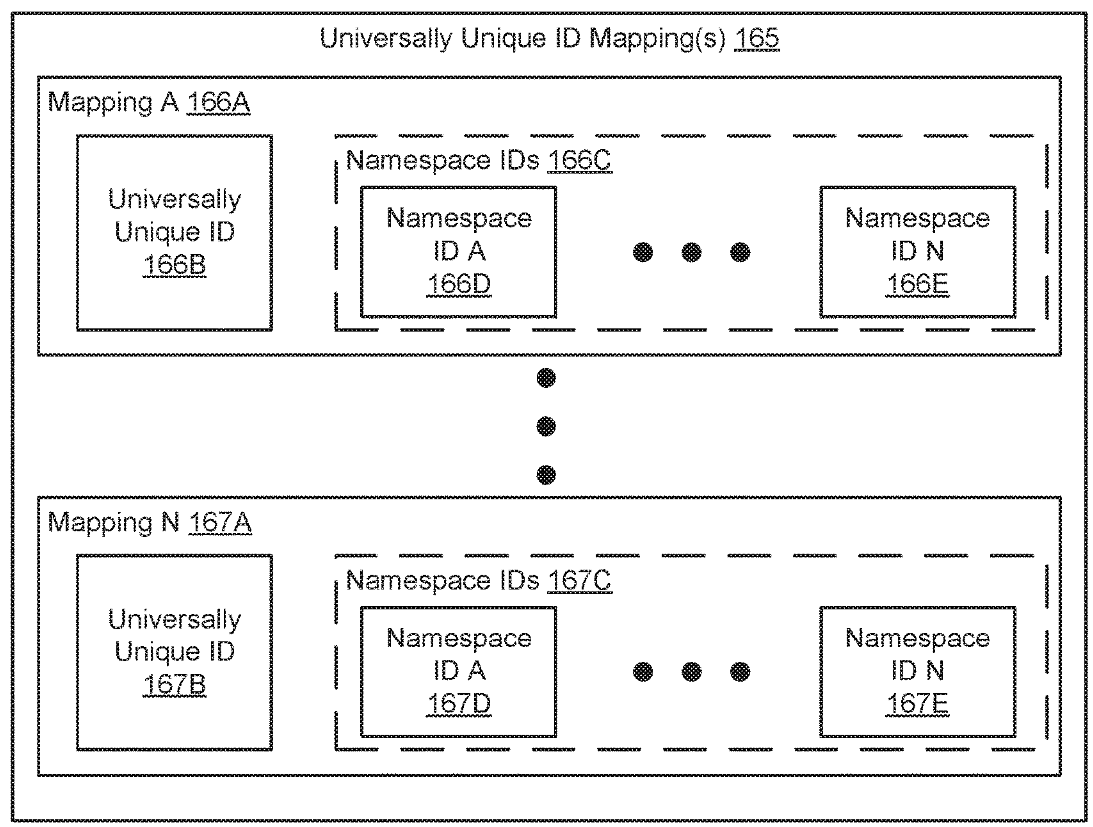
FIG. 1H shows a diagram of universally unique identifier (UUID) mappings in accordance with one or more embodiments of the invention.

FIG. 1H shows an example of UUID mapping(s) (165). The aforementioned mappings may include a number of mappings (166A, 167A) that each map a UUID (166B, 167B) to namespace ID(s) (166C, 167C) of the tenant resources (121, FIG. 1) of the data storage device. Each of the namespace IDs may belong to different tenant resources (e.g., 121, FIG. 1). The UUID mapping(s) (165) facilitate determining which namespaces of the tenants include the queried UUID.

Figure 1I:
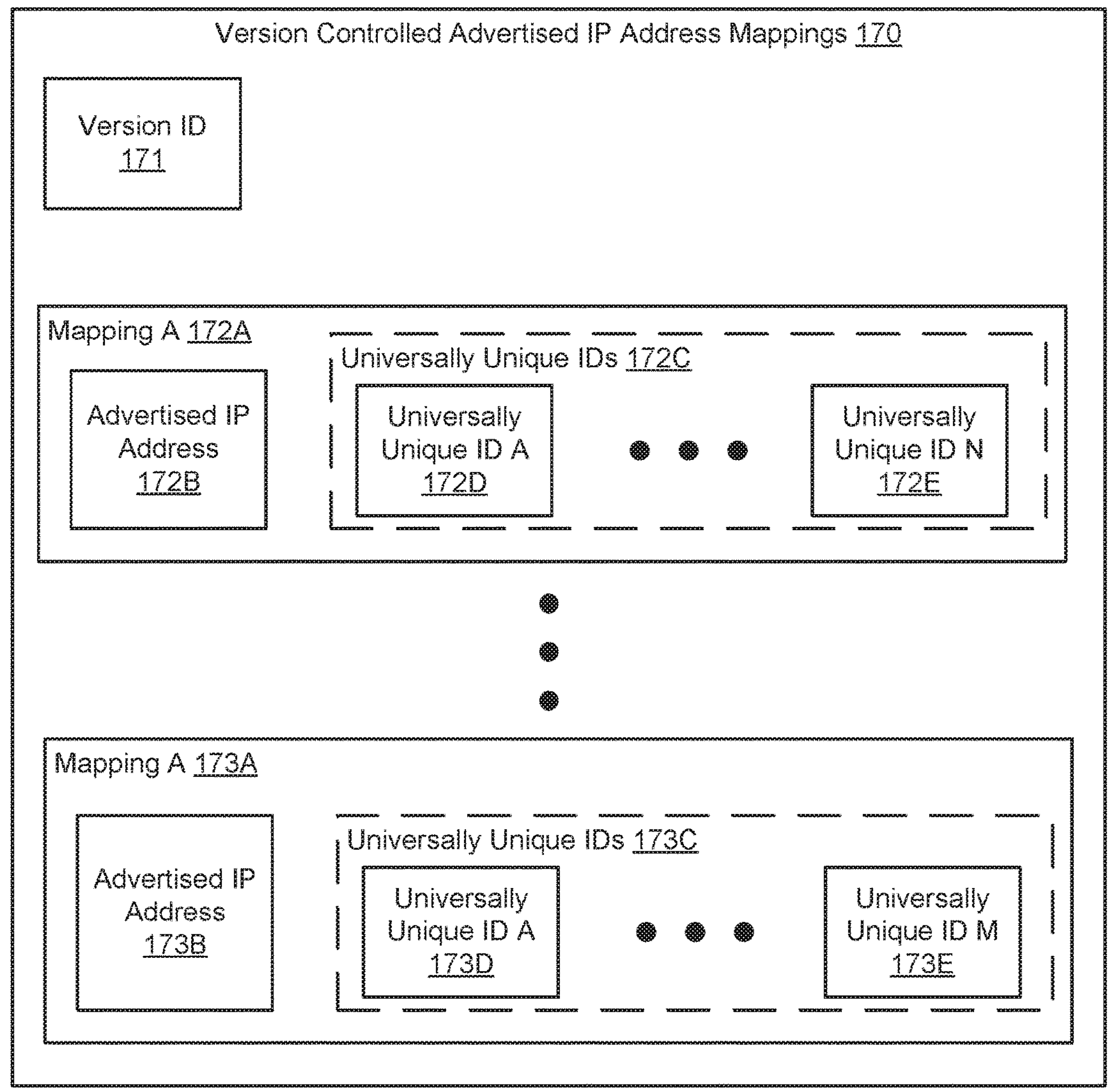
FIG. 1I shows a diagram of version controlled advertised IP address mappings in accordance with one or more embodiments of the invention.

FIG. 1I shows an example of version controlled advertised IP address mapping(s) (170). The aforementioned mappings may include a number of mappings (172A, 173A) that each map an advertised IP address (172B, 173B) to UUID(s) (172C, 173C) of the object storage of the data storage device. The version controlled advertised IP address mapping(s) (170) facilitate determining which UUIDs of the object storage are associated with a queried advertised IP address.

Additionally, the version controlled advertised IP address mapping(s) (170) may include a version ID (171). Each time the aforementioned mappings are updated, the version number may be incremented.

Figure 1J:
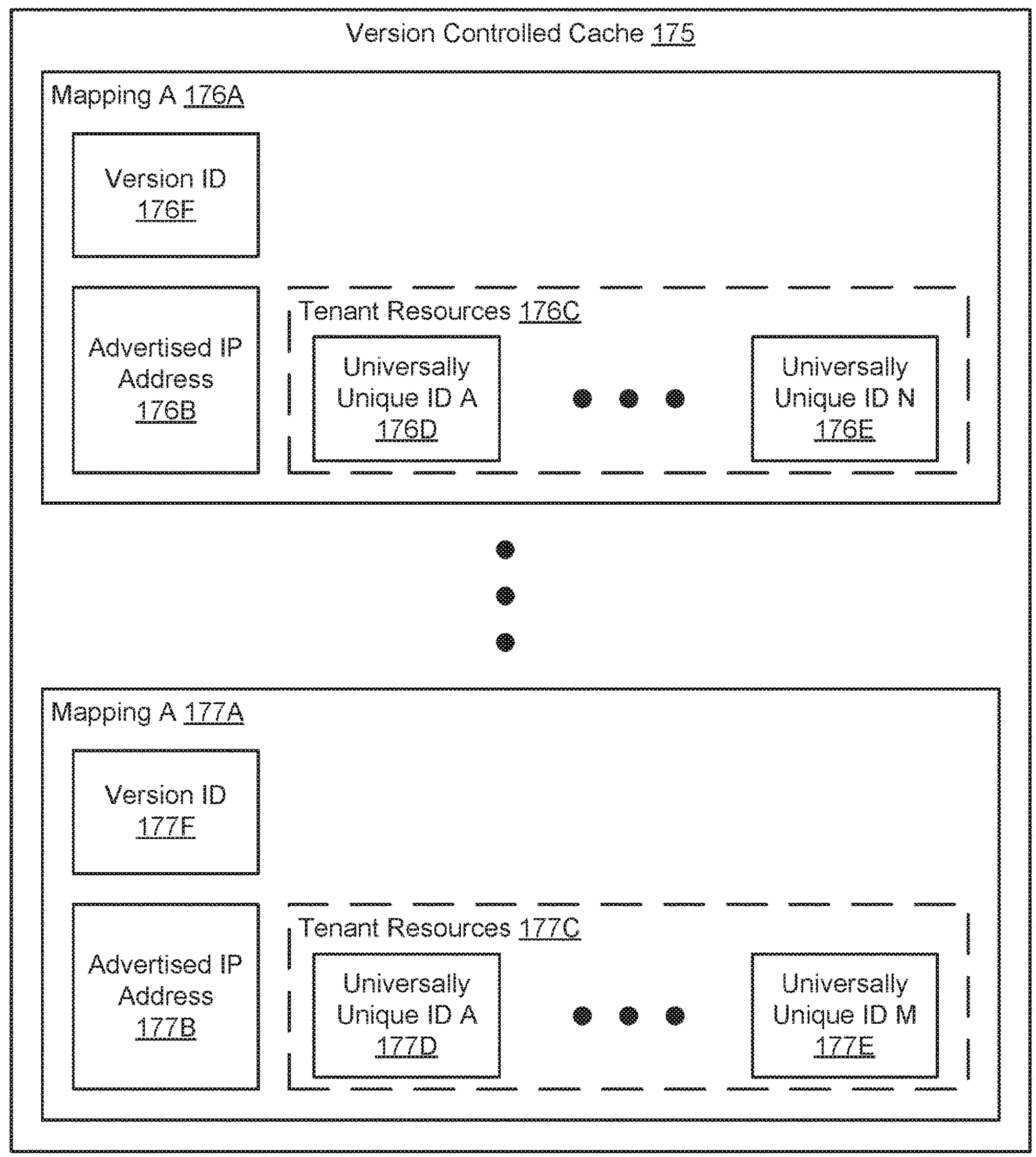
FIG. 1J shows a diagram of tenant resource to advertised IP address mappings in accordance with one or more embodiments of the invention.

FIG. 1J shows an example of version controlled cache (175). The aforementioned cache may include a number of mappings (176A, 177A) that each map an advertised IP address (176B, 177B) to UUID(s) (176C, 173C) of the object storage of the data storage device. The version controlled cache (175) facilitates determining which UUIDs of the object storage are associated with a queried advertised IP address.

Additionally, each mapping (176A, 177A) may include a version ID (176F, 177F). As will be discussed with respect to FIG. 6, the version ID (176F, 177F) of a mapping may be compared with a version ID (171, FIG. 1I) of the version controlled advertised IP address mapping(s) (170) to determine whether the mapping (176A, 177A) is up to date.

Figure 2:
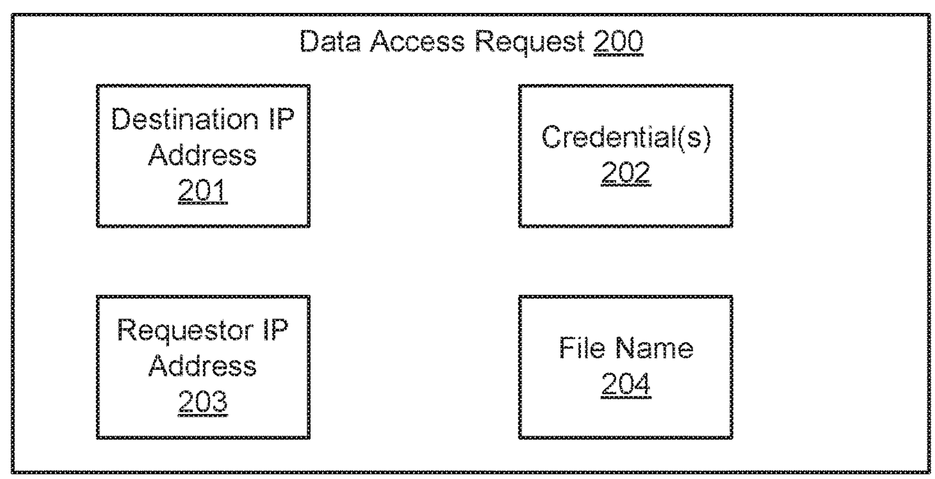
FIG. 2 shows a diagram of data access request in accordance with one or more embodiments of the invention.

FIG. 2 shows a diagram of a data access request (200) in accordance with one or more embodiments of the invention. The data access request (200) may be sent to the data storage device by a client to request data stored in the object storage. The data access request (200) may include a destination IP address (201), credential(s) (202), a requestor IP address (203), and a file name (204) or other identifier associated with data the requestor wishes to obtain. The credential(s) (202) may be a password or other information required to access the requested data.

Figure 3:
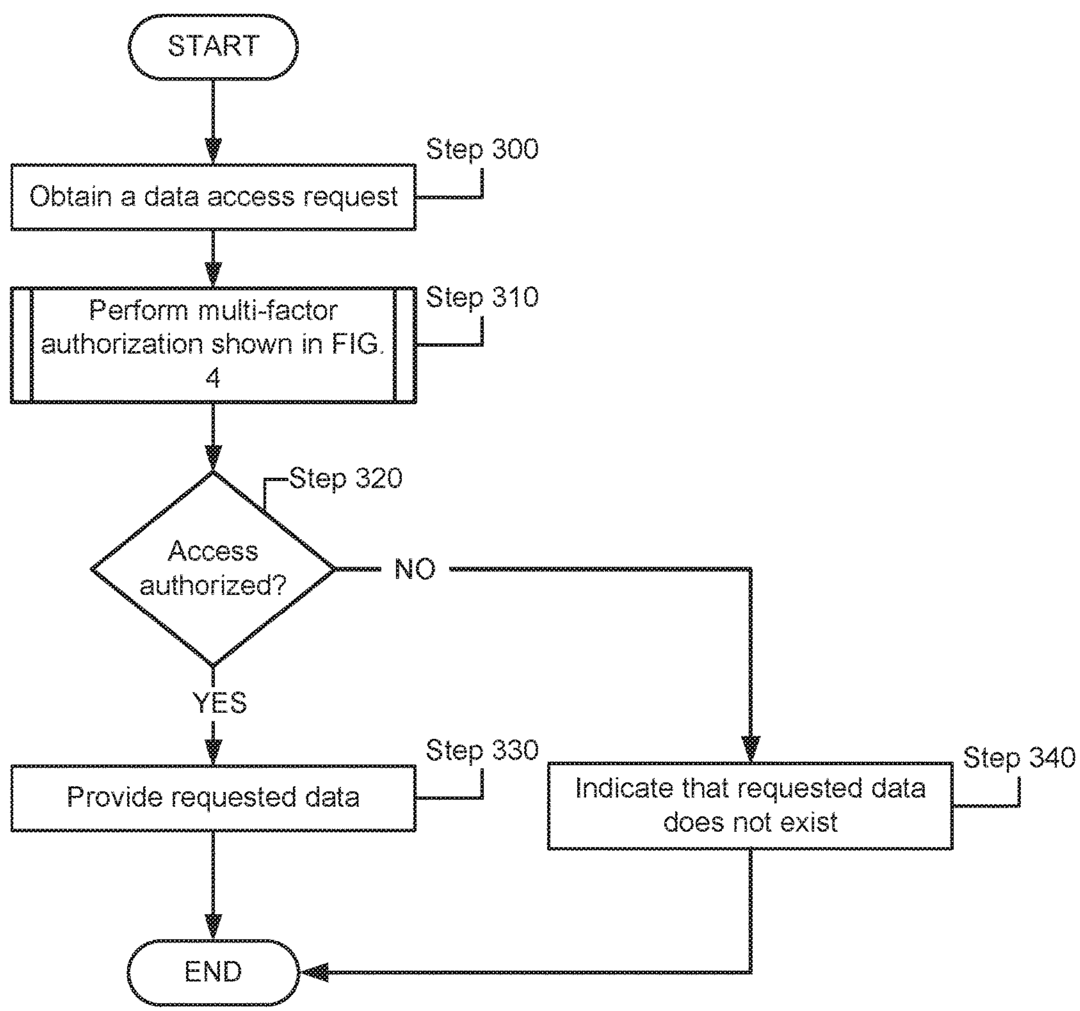
FIG. 3 shows a flowchart of a method of operating a data storage device in accordance with one or more embodiments of the invention.

FIG. 3 shows a flowchart according to one or more embodiments of the invention. The method depicted in FIG. 3 may be used to provide data stored in an object storage of a data storage device in accordance with one or more embodiments of the invention. The method shown in FIG. 3 may be performed by, for example, a resource request processor (149, FIG. 1A).

In Step 300, a data access request is obtained. The data access request may be obtained by receiving the data access request from a client. The data access request may include all of the components of the data access request shown in FIG. 2.

In Step 310, a multifactor authorization of the data access request is performed. The multifactor authorization may be performed using the method shown in FIG. 4.

In Step 320, it is determined whether access to the requested is authorized based on the multifactor authorization. If access is authorized, the method proceeds to Step 330. If access is not granted, the method proceeds to Step 340.

In Step 330, the requested data is provided. The data may be provided by sending the data specified by the data access request and stored in the object storage to the requestor. The requestor may be a client.

In Step 340, the requested is not provided and the data storage device responds to the request by indicating that the requested data does not exist.

Figure 4:
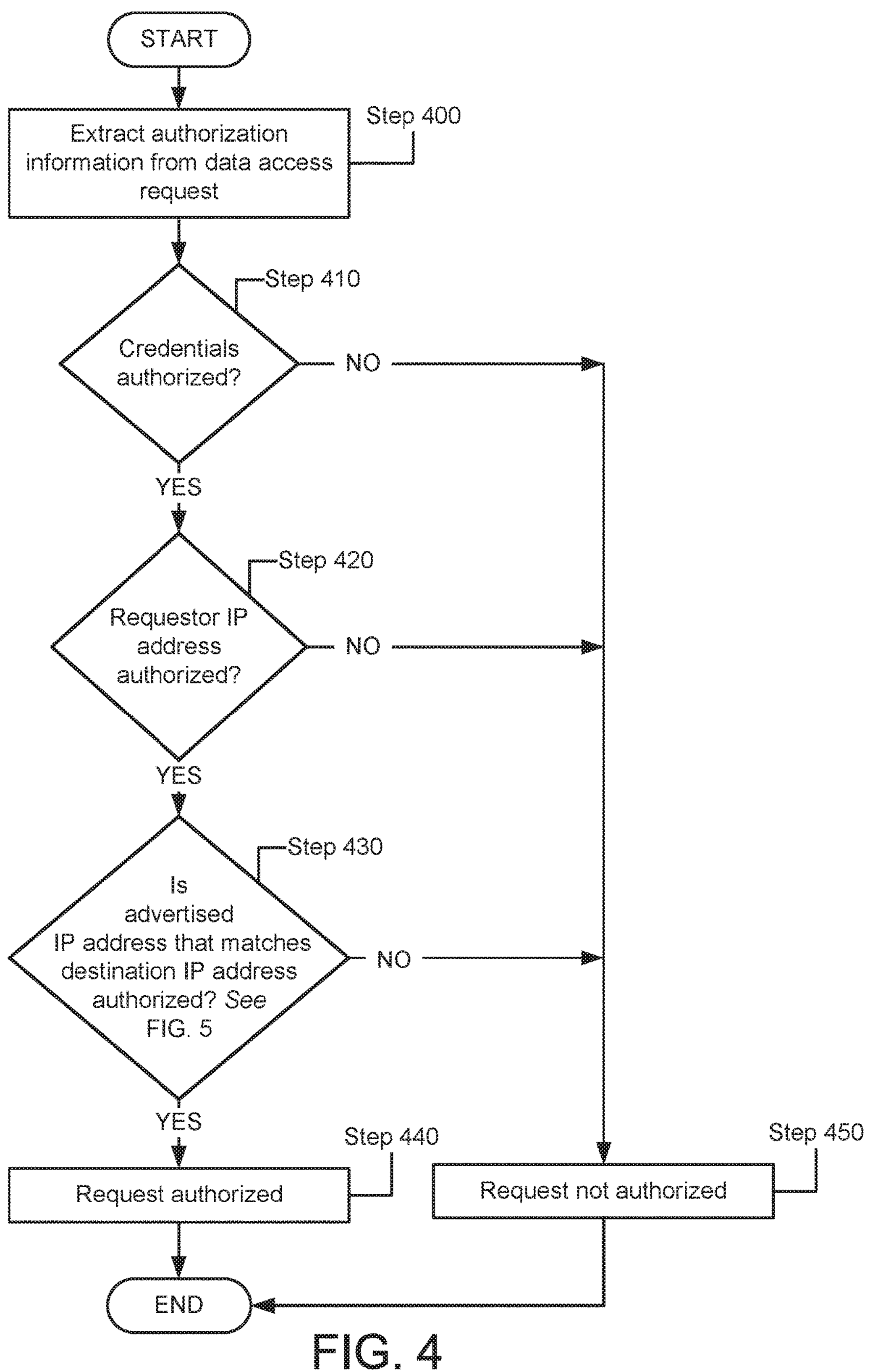
FIG. 4 shows a flowchart of a method of performing an multifactor authorization in accordance with one or more embodiments of the invention.

FIG. 4 shows a flowchart according to one or more embodiments of the invention. The method depicted in FIG. 4 may be used to perform a multifactor authorization in accordance with one or more embodiments of the invention. The method shown in FIG. 4 may be performed by, for example, a resource request processor (149, FIG. 1A). The method may be performed by different component of the data storage device without departing from the invention.

In Step 400, authorization information is obtained from the data access request discussed with respect to FIG. 3. The authorization information may include a destination IP address, a credential, a requestor IP address, and a file name (or other indicator of the requested data).

In Step 410, it is determined whether the credentials are authorized. If the credentials are authorized, the method proceeds to Step 420. If the credentials are not authorized, the method proceeds to Step 450.

In one or more embodiments of the invention, determining whether the credentials are authorized is performed by comparing the credentials included in the data access request to credentials associated with each tenant. If the credentials do not match the credentials associated with at least one tenant, the credentials are determined to be not authorized. In one or more embodiments of the invention, the credentials are a password, bit sequence, or other data file provided by a tenant.

In Step 420, it is determined whether the requestor IP address is authorized. If the requestor IP address is authorized, the method proceeds to Step 430. If the requestor IP address is not authorized, the method proceeds to Step 450.

In one or more embodiments of the invention, determining whether the requestor IP address is authorized is performed by matching the credentials included in the data access request to one IP address of a set of IP addresses associated with the credentials. If the requestor IP address does not match an IP address of the set of IP addresses, the requestor IP address is determined to be not authorized. If the requestor IP address matches an IP address of the set of IP addresses, the requestor IP address is determined to be authorized.

In one or more embodiments of the invention, the set of IP addresses associated with the credentials are provided by a tenant. In other words, a tenant may provide a list of IP addresses that the tenant wishes to have access to the tenant's data stored in the data storage device.

In Step 430, it is determined whether an advertised IP address that matches the destination IP address of the data access request is authorized. If the matched advertised IP address is authorized, the method proceeds to Step 440. If the matched advertised IP address is not authorized, the method proceeds to Step 450.

Figure 5:
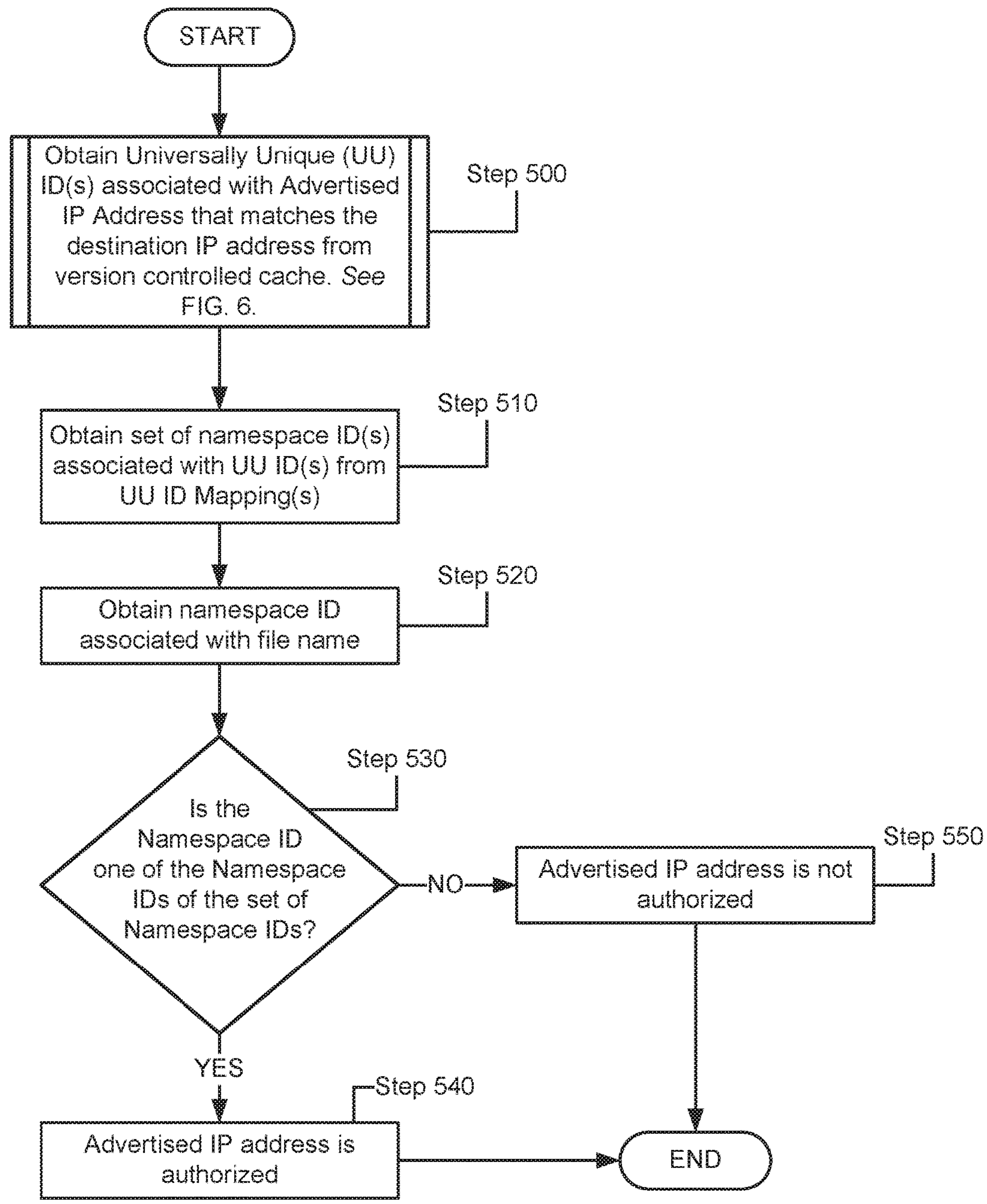
FIG. 5 shows a flowchart of a method of determine whether an advertised IP address is authorized in accordance with one or more embodiments of the invention.

In one or more embodiments of the invention, determining whether the matched advertised IP address is authorized is performed by the method shown in FIG. 5.

In Step 440, the data access request is determined to be authorized. The method may end following Step 440.

In Step 450, the data access request is determine to not be authorized. The method may end following Step 450.

FIG. 5 shows a flowchart according to one or more embodiments of the invention. The method depicted in FIG. 5 may be used to determine whether a matched advertised IP address is authorized in accordance with one or more embodiments of the invention. The method shown in FIG. 5 may be performed by, for example, a resource request processor (149, FIG. 1A). The method may be performed by a different component of the data storage device without departing from the invention.

In Step 500, a UUID associated with the advertised IP address that matches the destination IP address is obtained from a version controlled cache. The UUID may be obtained from the cache by the method shown in FIG. 6.

In Step 510, a set of namespace IDs associated with the UUIDs are obtained from the UUID mappings. In one or more embodiments of the invention, the namespace IDs are obtained by matching the UUIDs to mappings specified by the UUID mappings. Each mapping may specify one or more namespace IDs. The namespace IDs of each matched mapping may be aggregated and used as the set of namespace IDs.

In Step 520, a namespace ID associated with the file name or other data identification information included in the data access request is obtained. The associated namespace ID may be obtained by comparing the filename or other identification information to the tenant resources. More specifically, each of the namespaces of a set of tenant resources associated with the credentials included in the data access request may be search to identify a namespace that includes the filename or identification information. The namespace ID of the namespace that includes the filename or identification information may be used as the associated namespace ID.

In Step 530, it is determined whether the namespace ID associated with the filename matches one of the set of namespace IDs. If the namespace ID associated with the filename matches one of the namespace IDs of the set of namespace IDs, the method proceeds to Step 540. If the namespace ID associated with the filename does not match one of the namespace IDs of the set of namespace IDs, the method proceeds to Step 550.

In Step 540, the advertised IP address that matches the destination IP address of the data access request is determined to be authorized. The method may end following Step 540.

In Step 550, the advertised IP address that matches the destination IP address of the data access request is determined to not be authorized. The method may end following Step 550.

Figure 6:
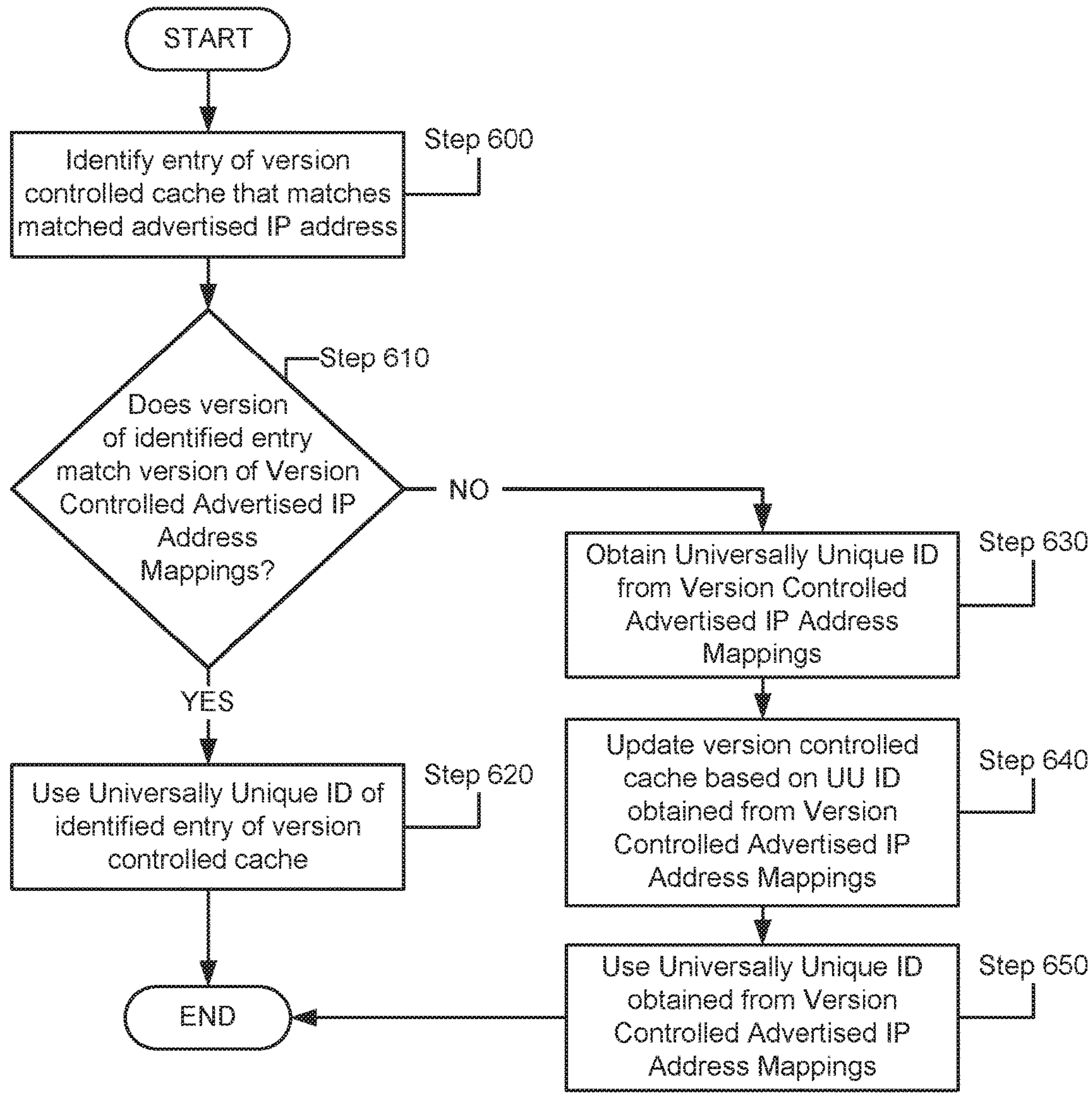
FIG. 6 shows a flowchart of a method of obtaining a UUID associated with an advertised IP address in accordance with one or more embodiments of the invention.

FIG. 6 shows a flowchart according to one or more embodiments of the invention. The method depicted in FIG. 6 may be used to obtain a UUID from a version controlled cache in accordance with one or more embodiments of the invention. The method shown in FIG. 6 may be performed by, for example, a resource request processor (149, FIG. 1A). The method may be performed by a different component of the data storage device without departing from the invention.

In Step 600, the advertised IP address is matched to an entry of the version controlled cache.

In Step 610, it is determined whether a version ID of the matched entry matches a version ID of version controlled advertised IP address mappings. In one or more embodiments of the invention, the version ID of the version controlled advertised IP address mappings is a version number of all of the entries of the mappings. If the version ID of the matched entry matches the version ID of the mappings, the method proceeds to Step 620. If the version ID of the matched entry does not match the version ID of the mappings, the method proceeds to Step 630.

In Step 620, the UUID of the identified entry of the version controlled cache is used.

In Step 630, a UUID from the version controlled advertised IP address mappings is obtained. The UUID may be obtained from the mappings by matching the advertised IP address to one of the mappings. The UUID specified by the matched mapping may be used as the obtained UUID.

In Step 640, the identified entry of the version controlled cache is updated based on the UUID obtained from the version controlled advertised IP address mappings and the UUID obtained from the mappings. Specifically, the UUID of the entry of the cache is replaced by the UUID of the entry of the mappings and the version ID of the entry of the cache is replaced by the version ID of the mappings.

In Step 650, the UUID of the entry of the version controlled advertised IP address mappings is used.

The method may end following Step 650.

The following is an example. The example is included for explanatory purposes and is not limiting.

Example 1

FIGS. 7A-7D show an explanatory example of a data storage device (700) in accordance with embodiments of the invention. The data storage device (700) is similar to the data storage device shown in FIGS. 1A and 1*s* configured to perform similar functions.

Figure 7A:
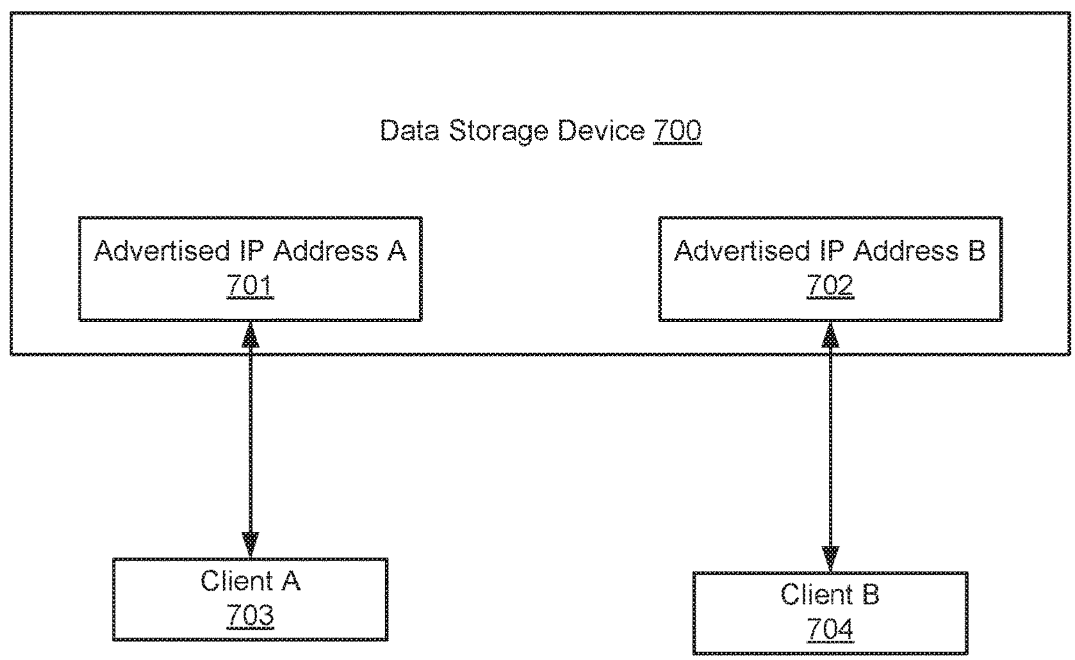
FIG. 7A shows a diagram of an example system.

FIG. 7A shows a diagram connections between the data storage device (700) and a client A (703) and a client B (704). Each of the clients may be operably connected to the data storage device (700) via network connections.

The data storage device (700) may advertise multiple IP addresses. More specifically, the data storage device (700) may advertise IP address A (701) and IP address B (702). Client A (703) may be programmed to address data access requests to advertised IP address A (701) and client B (704) may be programmed to address data access requests to advertised IP address B (702).

Figure 7B:
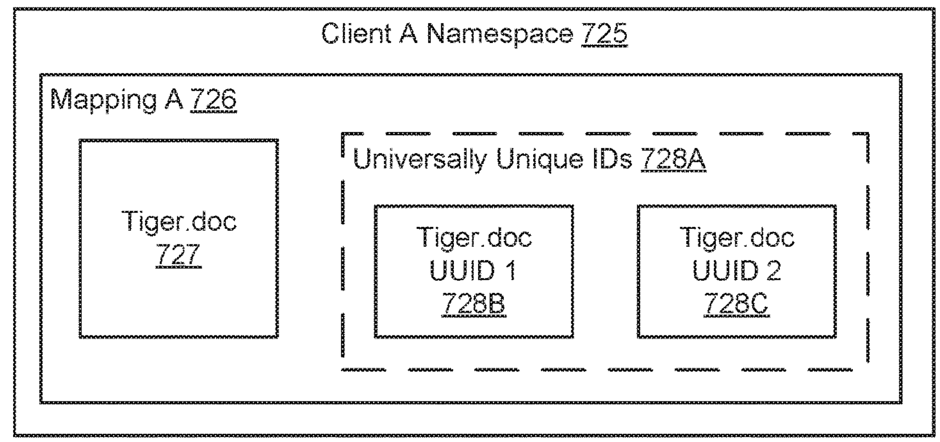
FIG. 7B shows a diagram of namespaces stored in the data storage device and associated with each of the clients, respectively, shown in FIG. 7A.
Figure 7B:
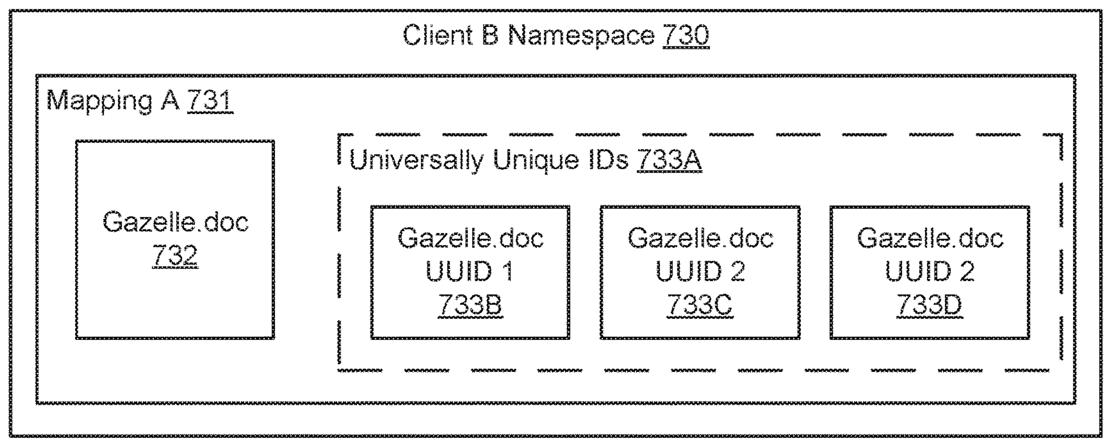
Figure 7C:
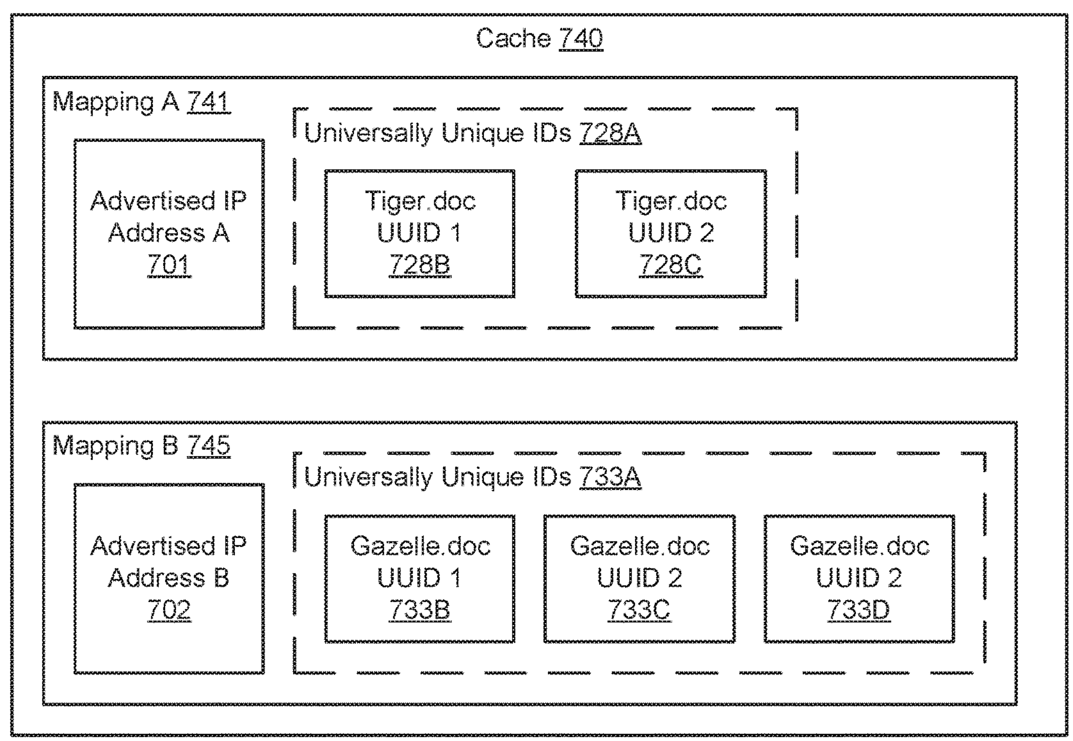
FIG. 7C shows a diagram of a cache of the data storage device shown in FIG. 7A.

The data storage device (700) may include tenant resources associated with client A and client B, respectively. More specifically, the data storage device (700) may include a client A namespace (725) that specifies files stored in the data storage device that were stored by client A, a client B namespace (730) that specifies files stored in the data storage device that were stored by client B, and an advertised IP address mappings (740) as shown in the diagrams of FIGS. 7B and 7C. The advertised IP address mappings may specify segments stored in the object storage that may only be accessed when a corresponding advertised IP address is included in the data access request.

Figure 7D:
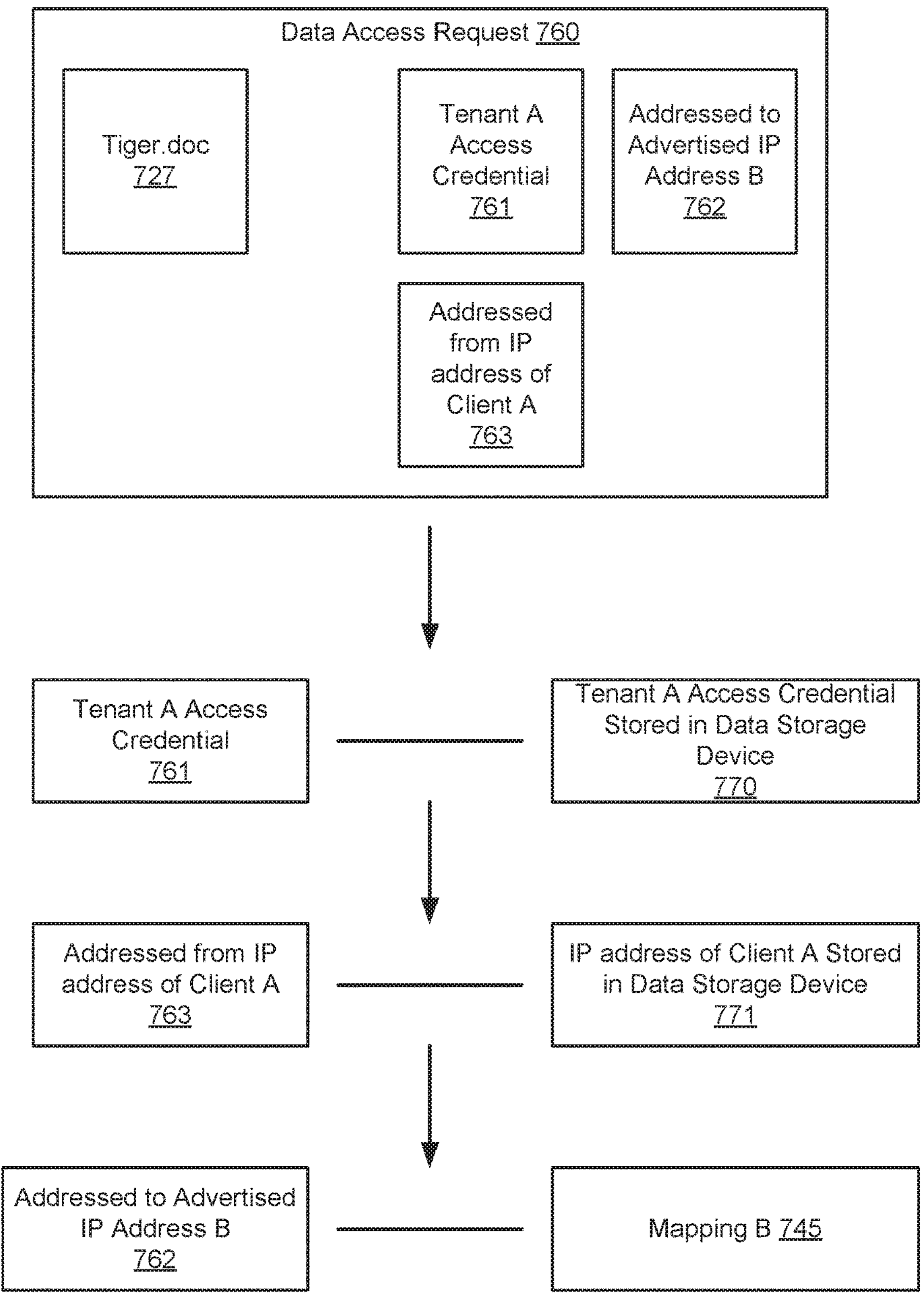
FIG. 7D shows a sequence diagram of operations performed by client B and the data storage device shown in FIG. 7A.

FIG. 7D shows a sequence diagram of operations performed by client B and the data storage device.

In the first operation, client B forms a data access request (760). The data access request specifies a file, tiger.doc (727), included in the data storage device that was stored by client A. In other words, the data access request (760) generated by client B requests access to a file in the data storage device that was stored by client A.

The data access request (760) includes multiple pieces of information that may be used by the data storage device to perform a multifactor authorization before providing access to the requested tiger.doc (727) file. These pieces of information include a tenant A access credential (761), the IP address to which the data access request (760) is addressed, i.e., addressed to advertised IP address B (762), and the IP address from which the data access request (760) originated, i.e., the address from IP address of client A (763).

As seen from the diagram, the data access request (760) includes two pieces of authentication information that attempts to bypass the security features of the data storage device. The first is that the data access request (760) is being addressed from IP address of client A (763). In other words, client B is spoofing the IP address of the packets that include the data access request to make it appear that the packets including the data access request originated from client A. The second is that the data access request (760) include access credentials of tenant A, i.e., Tenant A access credential (761), rather than tenant B. In other words, client B has obtained the access credentials of tenant A and is trying to use those access credentials to access files stored by client A in the data storage device.

Once generated, client B sends the data access request (760) to the data storage device. In response to receiving the data access request (760) the data storage device performs the methods illustrated in FIGS. 3-6.

The data storage device first matches the tenant A access credential (761) included in the data access request (760) to a copy of the tenant A access credential stored in the data storage device (770). Thus, the access credential included in the request satisfies the first step of the multifactor authentication.

The data storage device then matches the IP address from which the data access request was sent, i.e., address from IP address of client A (763), to an IP address of client A stored in the data storage device (771). Thus, the spoofed IP address of client A included in the data access request satisfies the second step of the multifactor authentication.

The data storage device then matches the IP address to which the data access request was sent, i.e., addressed to advertised IP address B (762), to mapping B (745) of the advertised IP address mappings (740) shown in FIG. 7C. However, mapping B (745) indicates that any data access requests addressed to advertised IP address B (762) may only access a portions of the segments stored in the data storage device. The portion of the segments do not include the segments needed to reconstruct the tiger.doc file specified by the data access request.

In response to determining that the requested file cannot be reconstructed, the data storage device responds to client B (704, FIG. 7A) by indicating that the requested file, i.e., tiger.doc, does not exist.

Thus, as shown in FIGS. 7A-7D, a data access device in accordance with embodiments of the invention is able to prevent unauthorized access to files even when a requestor has an access credential of the file and spoofs an IP address of a client that is authorized to access the file.

One or more embodiments of the invention may be implemented using instructions executed by one or more processors in the data storage device. Further, such instructions may correspond to computer readable instructions that are stored on one or more non-transitory computer readable mediums.

One or more embodiments of the invention may enable one or more of the following: i) securing of data stored in an object storage from unauthorized access, ii) segmenting access to data stored in the object storage based on a multifactor authorization, iii) securing data from unauthorized clients that mislabel packets sent from their IP address to match those of IP addresses that are authorized to access data stored in the object storage, iv) reducing the computational/bandwidth/storage access requirements of performing a multifactor authorization by using a version controlled cache that is built only at startup of the data storage device, and v) reducing a cognitive burden on a client by using passive information, e.g., destination/requestor IP addresses, as part of the multifactor authorization which a user does not need to remember.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A data storage device, comprising:

persistent storage that stores:

a plurality of advertised internet protocol (IP) addresses that are advertised by the data storage device each associated with different portions of data stored in an object storage, and the object storage; and a processor programmed to:

obtain a data access request, comprising a destination IP address, that requests a portion of data stored in the object storage, perform a multifactor authorization, comprising:

matching the destination IP address to one of the plurality of advertised IP addresses, to obtain a matched advertised IP address; and making a first determination that the matched advertised IP address is associated with the portion of data, wherein the first determination comprises:

obtaining a universally unique identifier (UUID) associated with the matched advertised IP address, using an entry of a version controlled cache that is associated with the matched advertised IP address;

matching a first namespace identifier, associated with the portion of data, to a second namespace identifier, of a set of namespace identifiers associated with the UUID; and make a second determination to allow access to the portion of data based on the multifactor authorization.

2. The data storage device of claim 1, wherein obtaining the UUID comprises:

performing a comparison between a first version number specified by the entry of the version controlled cache to a second version number specified by a version controlled set of advertised IP address mappings;

updating the entry of the version controlled cache based on the comparison; and using a UUID specified by the version controlled set of advertised IP address mappings as the obtained UUID.

3. The data storage device of claim 1, wherein the UUID comprises information that enables the portion of data to be obtained from the object storage.

4. The data storage device of claim 1, wherein obtaining the first namespace identifier associated with the portion of data comprises matching a credential included in the data access request to a first tenant resources of a plurality of tenant resources, wherein the first tenant resources of the plurality of tenant resources specify a first plurality of namespaces.

5. The data storage device of claim 4, wherein a second tenant resources of the plurality of tenant resources specify a second plurality of namespaces.

6. The data storage device of claim 5, wherein a first namespace of the first plurality of namespaces comprises a first set of UUIDs, wherein a second namespace of the second plurality of namespaces comprises a second set of UUIDs, wherein a UUID of the first set of UUIDs is the same as a UUID of the second set of UUIDs.

7. The data storage device of claim 1, wherein the multifactor authorization further comprises:

matching a credential included in the request to a credential associated with the portion of data.

8. The data storage device of claim 7, wherein the multifactor authorization further comprises:

matching an IP address of a requestor to a requestor IP address associated with the portion of data.

9. The data storage device of claim 1, wherein the data comprises:

first data associated with a first tenant;

second data associated with a second tenant; and third data associated with both of the first tenant and the second tenant.

10. The data storage device of claim 9, wherein the data access request comprises a credential associated with one selected from a group consisting of the first tenant and the second tenant.

11. The data storage device of claim 1, wherein the plurality of advertised IP addresses cause network traffic addressed to any of the plurality of IP addresses to be sent to the data storage device.

12. A method of operating a data storage device, comprising:

advertising, by the data storage device, a plurality of advertised internet protocol (IP) addresses each associated with different portions of data stored in an object storage stored in persistent storage;

obtaining, by the data storage device, a data access request, comprising a destination IP address, that requests a portion of data stored in the object storage;

perform a multifactor authorization, comprising:

matching the destination IP address to one of the plurality of advertised IP addresses, to obtain a matched advertised IP address; and making a first determination that the matched advertised IP address is associated with the portion of data, wherein the first determination comprises:

obtaining a universally unique identifier (UUID) associated with the matched advertised IP address, using an entry of a version controlled cache that is associated with the matched advertised IP address;

matching a first namespace identifier, associated with the portion of data, to a second namespace identifier, of a set of namespace identifiers associated with the UUID; and make a second determination to allow access to the portion of data based on the multifactor authorization.

13. The method of claim 12, wherein obtaining the UUID comprises:

performing a comparison, by the data storage device, between a first version number specified by the entry of the version controlled cache to a second version number specified by a version controlled set of advertised IP address mappings; and updating, by the data storage device, the entry of the version controlled cache based on the comparison.

14. A non-transitory computer readable medium comprising computer readable program code, which when executed by a computer processor enables the computer processor to perform a method for operating a data storage device, the method comprising:

advertising, by the data storage device, a plurality of advertised internet protocol (IP) addresses each associated with different portions of data stored in an object storage stored in persistent storage;

obtaining, by the data storage device, a data access request, comprising a destination IP address, that requests a portion of data stored in the object storage, perform a multifactor authorization, comprising:

matching the destination IP address to one of the plurality of advertised IP addresses, to obtain a matched advertised IP address; and making a first determination that the matched advertised IP address is associated with the portion of data, wherein the first determination comprises:

obtaining a universally unique identifier (UUID) associated with the matched advertised IP address, using an entry of a version controlled cache that is associated with the matched advertised IP address;

matching a first namespace identifier, associated with the portion of data, to a second namespace identifier, of a set of namespace identifiers associated with the UUID; and make a second determination to allow access to the portion of data based on the multifactor authorization.

* * * * *